United States Patent [19]

Cyr et al.

[11] Patent Number: 4,974,256
[45] Date of Patent: Nov. 27, 1990

[54] LOAD BALANCING AND OVERLOAD CONTROL IN A DISTRIBUTED PROCESSING TELECOMMUNICATIONS SYSTEM

[75] Inventors: Bernard L. Cyr, Aurora, Ill.; Joseph S. Kaufman, Holmdel; Tzongyu P. Lee, Edison, both of N.J.

[73] Assignee: AT&T Bell Laboratories, Murray Hill, N.J.

[21] Appl. No.: 375,102

[22] Filed: Jun. 30, 1989

[51] Int. Cl.⁵ .................... H04M 11/00; H04Q 3/66; H04Q 7/04
[52] U.S. Cl. ..................................... 379/113; 379/59; 379/269
[58] Field of Search ......................... 379/113, 269, 59

[56] References Cited

U.S. PATENT DOCUMENTS

| | | | |
|---|---|---|---|
| 4,611,322 | 9/1986 | Larson et al. | 370/60 |
| 4,658,098 | 4/1987 | Wegmann | 379/113 |
| 4,670,899 | 6/1987 | Brody et al. | 379/60 |
| 4,737,983 | 4/1988 | Frauenthal et al. | 379/221 |
| 4,788,718 | 11/1988 | McNabb et al. | 379/113 |
| 4,790,005 | 12/1988 | Hauselka et al. | 379/244 |
| 4,827,499 | 5/1989 | Warty et al. | 379/58 |

Primary Examiner—Thomas W. Brown
Attorney, Agent, or Firm—Scott W. McLellan

[57] ABSTRACT

This invention relates to a method of allocating new telecommunications cells to one of a plurality of processors, and to control acceptance of new calls when in overload. The method is based on measuring the real time occupancy of each processor periodically, and allocating new calls for the following period in such a way as to attempt to make each processor's occupancy approach the average occupancy of all the processors. An overload state is detected when the average occupancy of the processors in one period exceeds a predetermined threshold, e.g., 90%. When this happens, load is shed in an amount calculated to restore the average occupancy to the threshold value over a number of periods of time. Advantageously, this method optimizes the call processing capacity of the processors.

15 Claims, 2 Drawing Sheets

LOAD BALANCING AND OVERLOAD CONTROL IN A DISTRIBUTED PROCESSING TELECOMMUNICATIONS SYSTEM

TECHNICAL FIELD

This invention relates to work allocation to processors in a distributed processing system.

PROBLEM

In certain stored program controlled telecommunications switching systems, such as AT&T's Autoplex TM 1000 system for serving cellular mobile radio telecommunications traffic, a plurality of processors are available for performing the data processing operations necessary to control each call in the system. Each of the plurality of processors is able to perform identical call processing functions required to serve such calls so that any new call can be served by any of these processors.

In such an arrangement, in order to maximize system capacity and minimize call setup delays, it is important to have a quality method of allocating each new call to an appropriate processor. It is also important to have a quality method for responding to overload conditions, so that the telecommunications traffic handled when subjected to overload is equal to or at least close to the maximum amount of traffic that the system can handle when not in overload and that additional calls in overload do not interfere with the processing of existing calls or those new calls already accepted by the system.

The amount of processor time required for each call varies substantially depending in the case of cellular radio on the number of cell boundaries and switching system boundaries that a mobile traverses in the course of its call, and on the features invoked by the call. These variations cannot be predicted when a call is first detected and therefore, even if the number of calls that is allocated to a particular processor can be controlled accurately, the amount of processing time required over a period of minutes for processing these calls will still vary by a substantial quantity.

In a prior art arrangement for the Autoplex 1000 system, described, for example, in Warty et al: U.S. Pat. No. 4,827,499, the fraction of new load which was allocated to each processor was determined initially by initialization parameters that were subject to modification if any processor went into an overload condition. Overall system overload (as opposed to individual processor overload) was recognized when the fraction of individual processors that were overloaded exceeded a threshold; then the percentage of new calls that were rejected was gradually and linearly increased at a fixed rate as long as the system was in overload and decreased in the same way when the system went out of overload. Using this arrangement, individual processors close to overload tended to be allocated too much traffic while underloaded processors were allocated too little, and the response to system overload was less than optimum.

In view of the foregoing, a problem of the prior art is that in a distributed processing telecommunications control system wherein calls may be allocated to different processors, there is not a quality arrangement for optimizing the traffic capacity of each processor and the performance of the system as a whole in overload. More generally, in distributed processing systems, there is not a good system for equitably distributing the traffic capacity of a plurality of processors to maximize the total system capacity.

SOLUTION

The above problem is solved and an advance is made over the prior art in accordance with this invention wherein, in an illustrative embodiment, the average real time work occupancy of each processor is measured periodically and based on this occupancy, the fraction of new calls to be allocated to each processor during the next period is adjusted in such a manner as to attempt to equalize the occupancy of all the processors during that period. In this illustrative embodiment, each of the processors measure their occupancy simultaneously and in synchronism and are polled periodically by a call allocation processor. The call allocation processor adjusts the fraction of new calls to be allocated to each processor during the next period by reducing that fraction for processors whose occupancy exceeds the average, and increasing the fraction for processors whose occupancy is less than the average. The fraction $S_{1i}$ of calls to be allocated during period 1 to the i'th processor is equal to $S_{1i} = S_{0i} + (A - a_i)G_1$, wherein $S_{0i}$ equals the fraction of new calls allocated to that processor during period 0 (the previous period), A is the average occupancy of all the processors during the previous period, $a_i$ is the occupancy of the i'th processor during the previous period, and $G_1$ is a feedback gain factor, determined by simulation and/or experience. Following implementation of the algorithm, our invention provides for a post solution result of a new call allocation split among all the call control processors. Advantageously, such an arrangement makes it possible to divert traffic from heavily loaded (though not overloaded) processors toward more lightly loaded processors and tends to spread the load evenly thus improving the capacity and responsiveness of the system. Advantageously, the responsiveness is maximized because a balanced load minimizes mean processing delays. A processor's occupancy can be contributed to, in part, by non-call processing loads (e.g., call assignment, data base updates) which are variable and unpredictable. This scheme automatically accounts for such side loads by shifting the call load, which is the majority of the load at any time in any of the processors, on the aggregate of processors.

If the average occupancy of the processors exceeds a threshold T (i.e., if $A > T$), or if the system was in the overload state during the previous interval (i.e., if $P_0$, the fraction of new calls accepted is less than 1), then a determination is made to allow a fraction $P_1$ of offered calls to be accepted, where $P_1$ is the percentage previously allowed ($P_0$), plus a multiple of the difference between T, the level of average occupancy of the processors at the threshold of overload, and A, the average measured occupancy. In one specific embodiment, $$P_1 = P_0 \left[ 1 + (T - A)\frac{G_2}{A} \right],$$

where $G_2$ is a feedback stabilization factor. Simulations on the Autoplex 1000 system have indicated that a value of $G_2 = 3$ is appropriate. For example, if $T = 0.9$, $A = 0.95$ and $G_2 = 3$, and $P_0 = 1$, signifying a sudden overload at the 0.95 occupancy load, where 0.9 represents the threshold, then $P_1 = 0.85$, or 15 per cent of load is shed. This fraction is then broadcast from the allocating processor to all new call request generating systems to request that they accept the specified fraction of new calls and reject or shed the remainder. Advantageously, such an arrangement allows the system to go into a load shedding mode quickly when necessary, and to stop shedding load unnecessarily as soon as possible.

Accordingly, this invention is an arrangement for distributing new load to one of a plurality of processors of a distributed processing system by measuring the occupancy of each of the processors and adjusting the fraction of new load to be allocated to each processor to attempt to equalize the occupancy of each of the processors.

DETAILED DESCRIPTION

Figure 1:
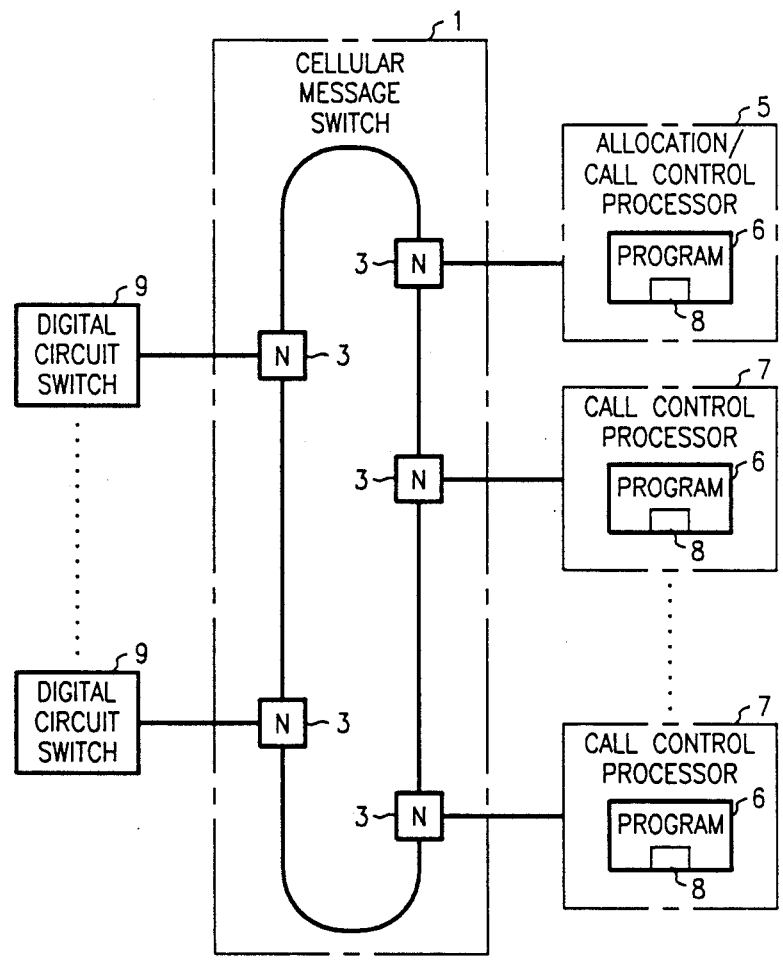
FIG. 1 is a block diagram of the control system of a prior art cellular telecommunications system.
Figure 2:
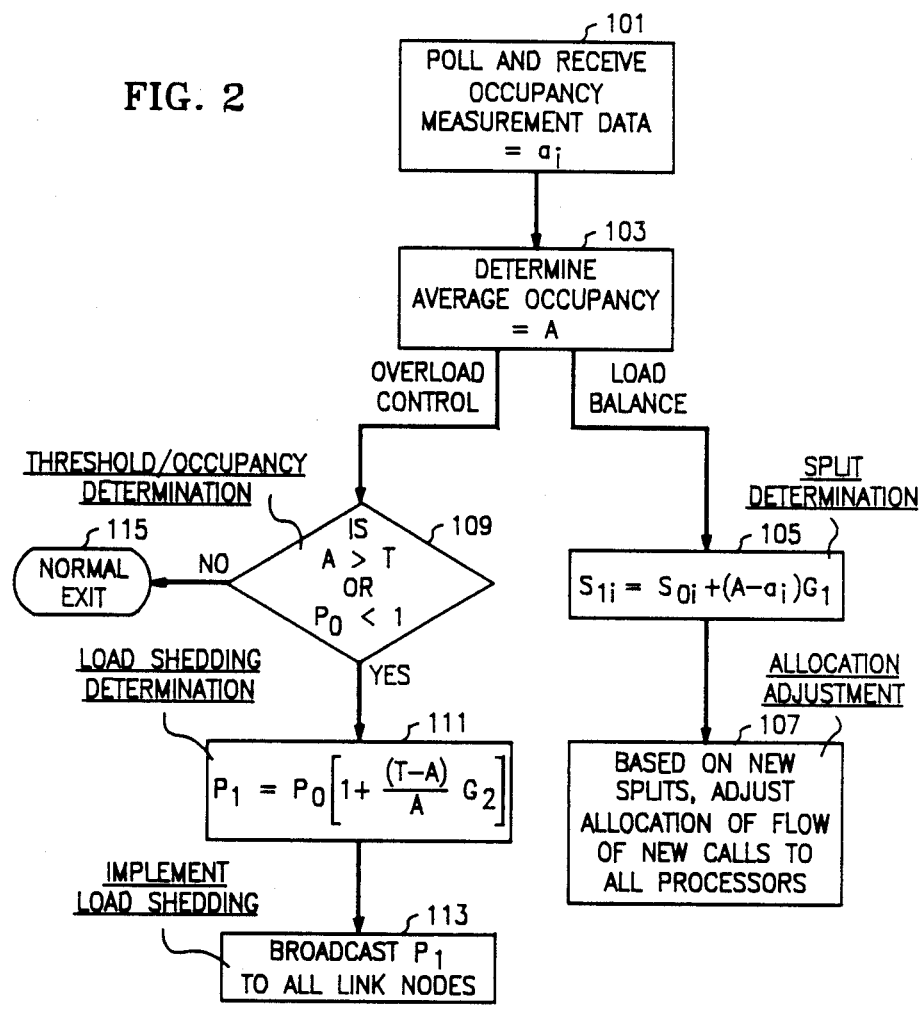
FIG. 2 is a flow diagram of a program executed in a call allocating processor for determining the allocation of calls to processors in a next interval, and for determining how much load to shed in overload.
Figure 3:
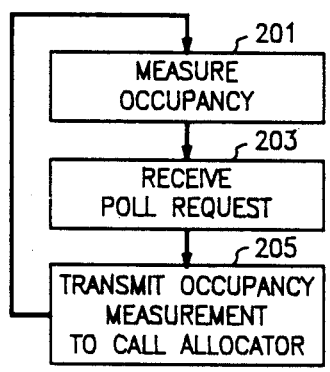
FIG. 3 is a flow diagram of an occupancy measurement and reporting process executed in all call control processors.

In the Autoplex 1000 system as described, for example, in U.S. Pat. No. 4,827,499, a plurality of call control processors (CCPs) is used for serving calls. FIG. 1 is a block diagram of the control system of the Autoplex 1000 system, modified according to the present invention. Any new call coming into the system can be assigned to any of these CCPs (5,7). The assignment is performed by one of these call control processors, called for convenience, an allocation/call control processor 5 (A/CCP). As shown in FIG. 3, each CCP 5,7 measures its own average occupancy over a period, in this case, ten seconds. FIG. 1 also shows a plurality of digital circuit switches (DCS) 9 for switching call connections. The DCS generate new call requests. These are transmitted over cellular message switch 1, a ring message switch with a plurality of nodes 3 for communicating among processors and switches. The new call requests are transmitted to A/CCP 5 for allocation to itself or one of the other CCPs 7. The invention is implemented by program 6, part of which is described in FIG. 2 and which resides in A/CCP 5; and program 8, included within program 6, described in FIG. 3, which resides in each of the processors 5,7.

Periodically, herein every ten seconds, the A/CCP polls each of the other CCPs and itself to receive the measurement of occupancy (action block 101, FIG. 1) and to start another period of occupancy measurement. The A/CCP calculates the average occupancy (A) by averaging the individual occupancies $a_i$ (action block 103). For load balancing purposes, the A/CCP then calculates a new split of allocation of new calls for the coming period according to the algorithm $S_{1i} = S_{0i} + (A - a_i)G_1$, wherein $S_{1i}$, $S_{0i}$ represent the fraction of calls allocated to the i'th processor during the next interval and the previous interval, respectively, A is the average occupancy of the processors as calculated in action block 103, $a_i$ is the occupancy reported by the i'th processor, and $G_1$ is a feedback gain parameter which is tuned to yield the desired dynamic response. $G_1$ is a function of the number of call control processors. Simulation studies for the Autoplex 1000 system have indicated that a value for $G_1 = 1/n$, where n is the number of working call control processors in the system, is appropriate. The value of $G_1$ must be changed if one or more of the CCPs is temporarily out of service. The period over which occupancy measurements are taken, and the call splits are adjusted, is also important; simulation studies for the Autoplex 1000 indicate that 10 seconds is a good choice for that system. The new allocation increases the fraction of new calls assigned to processors whose occupancy was below the average and decreases the fraction for processors whose occupancy was above the average. Based on these new calculated splits, a call allocation sequencer is regenerated to reflect the new splits; the call allocation sequencer is a table for implementation of variable percentage round-robin allocation.

Methods for implementing such variable round-robin allocations are well known in the art. In applicants' specific implementation, given the splitting percentages, a deterministic CCP call allocation sequence is generated that approximates the splitting percentages. For example, if a CCP's splitting percentage is 25, one-quarter of the entries in the assignment sequence will be given to that CCP. All sequence entries of a given CCP are evenly distributed throughout the sequence (to the degree possible). This ensures that calls are distributed as "evenly" as possible, thus minimizing mean queue lengths and service delays in any CCP. Clearly the length of the sequence determines the accuracy with which the splitting percentages can be approximated. In this embodiment, a length of 64 was selected. This was for a case of a maximum of 6 processors. More generally, for n processors, a length of 10 n appears to be appropriate. The call assignment algorithm walks through this sequence assigning the next call to the next CCP in the sequence (wrapping around when necessary).

The algorithm that generates the call assignment sequence attempts for each sequence element j to pick CCP(i) that minimizes the difference between the proportion of entries already allocated to CCP(i) in the first j−1 sequence entries and the call splitting percentage of CCP(i),

| for each sequence element j choose i to minimize $(d(i, j-1/j)-S_{1i}$ where: |  |
|---|---|
| $d(i, j-1)/j$ | is the proportion of sequence entries already given to CCP(i) in the first j-1 sequence entries |
| $S_{1i}$ | is the call split for CCP(i) |

At each call load balancing interval, the splitting probabilities are re-calculated and the call assignment sequence for the next interval is generated.

Blocks 109, 111, and 113 relate to overload control. Test 109 checks whether the system is already in the call shedding mode or if the average occupancy exceeds a threshold T. The latter test is the test used for entering the call shedding mode wherein a fraction of new calls is simply not accepted by the system. In this particular embodiment, calls are shed at random and no preference is made for either incoming land-originated mobile terminating calls or mobile originated calls. It might under some circumstances be desirable to shed more of the mobile originated calls when call shedding is necessary, since no resources have yet been used for such calls whereas land-originated calls have already had substantial resources used in setting up the connection to a mobile switching office. However, the disadvantage is that if this were done, then under overload mobile units would be able to receive most calls but would have a much lesser chance of being able to originate calls and this may be considered undesirable service to the mobile units.

If the result of test 109 is negative, then there is no need to perform any call shedding and the actions of this particular sequence is terminated (action block 115). If the result of test 109 is positive, then a new calculation is made for the percent of calls to be shed based on the present value of A. This calculation is shown in action block 111, is based on the algorithm $$P_1 = P_0 \left[ 1 + (T - A) \frac{G_2}{A} \right],$$

wherein $P_1$, $P_0$ represent the new and previous percentage of new calls accepted (if the system is just entering overload, then $P_0=1$), T is a predetermined threshold of average occupancy for invoking overload control, and $G_2$ is a gain factor which is tuned to yield the desired dynamic response. In the exemplary embodiment of the invention based on simulations, the value selected for $G_2$ is 3, and the value selected for T is 0.9. In this calculation, $P_1$ is truncated so that it can never exceed 1 and is never less than 0.05. The fraction $D_1$ of calls shed, $1 - P_1$, is:

$$D_1 = 1 - P_0 \left[ 1 + (T - A) \frac{G_2}{A} \right],$$

A value of $G_2$ above 1 is desirable in order to respond promptly to sudden overloads. The value of A is limited to 1 and if A is at that value, the actual overload may be far greater than that implied by the difference between 1 and T. Therefore, a sharp decrease in accepted load, made possible by a high value of $G_2$, protects the system against excessively long message queues and processing delays, which result in degraded performance in handling both old and new calls. A high value of $G_2$ also leads to a more rapid recovery from overload controls. It is possible that field experience will suggest the use of a high value of $G_2$ for imposing overload controls, i.e., decreasing $P_1$ whereas a lower value of $G_2$ may be appropriate for releasing overload controls, i.e., increasing $P_1$.

The value of $P_1$ is then broadcast to all the nodes which transmit call messages to the processors (action block 113). These nodes will then delete a fraction $1-P$, of new call messages and simply not forward these deleted messages to the A/CCP for allocation to processors.

The deletion process can be carried out by the following algorithm which is executed for each new call message:

```
A = A + (1 - P),
if A > 1
then drop the call message;
A = A - 1
else
send the call message
endif
```

Briefly, a parameter A, initially 0, is incremented by the fraction of calls to be deleted. Whenever A exceeds 1, the call message is dropped and A is decremented by 1; otherwise the call message is sent.

FIG. 3 shows the measurement process which is executed in each CCP7 and in A/CCP5. The length of real time segments is accumulated throughout the period of ten seconds (action block 201). The processor then receives a polling request from A/CCP5 (action block 203). In response, the processor converts the accumulated number into a percentage, representing the processor occupancy, transmits this occupancy measure to the A/CCP (action block 205) and resets the value of the real time segment accumulator to begin another cycle of measurement.

It is to be understood that the above description is only of one preferred embodiment of the invention. Numerous other arrangements may be devised by one skilled in the art without departing from the spirit and scope of the invention. The invention is thus limited only as defined in the accompanying claims.

We claim:

1. In a distributed multiprocessing telecommunications control system comprising a plurality of processors each for processing calls, a method of allocating new calls to ones of said plurality of processors comprising the steps of:
   receiving a measurement of real time work occupancy of each of said plurality of processors; and
   responsive to said received measurements, adjusting an allocation of new calls to each processor to equalize the occupancies of each of said processors.

2. In a distributed multiprocessing telecommunications control system comprising a plurality of processors each for processing calls, a method of allocating new calls to ones of said plurality of processors comprising the steps of:
   receiving a measurement of real time work occupancy of each of said plurality of processors;
   responsive to said received measurements, adjusting an allocation of new calls to each processor to equalize the occupancies of each of said processors;
   detecting that an average of said measured occupancies of said processors exceeds a predetermined threshold; and
   shedding a fraction of new calls, said fraction determined to change an average occupancy of said processors to approximately equal said threshold.

3. The method of claim 2 wherein said shedding comprises adjusting said shed fraction by a multiple of a difference between a predetermined threshold value and said average of said measured occupancies of said plurality of processors.

4. The method of claim 2 wherein said shed fraction is determined periodically by an algorithm:

$$D_1 = 1 - P_0 \left[ 1 + (T - A) \frac{G_2}{A} \right],$$

wherein $D_1$ represents said shed fraction for a next period, $P_0$ represents a fraction of calls accepted during a period immediately prior to said next period, T represents a predefined constant representing an average occupancy of said plurality of processors at a threshold of overload of said telecommunications control system, A represents average measured occupancy of said plurality of processors during said prior period and $G_2$ represents a predetermined gain factor.

5. In a distributed multiprocessing telecommunications control system comprising a plurality of processors each for processing calls, a method of allocating new calls to ones of said plurality of processors comprising the steps of:

receiving a measurement of real time work occupancy of each of said plurality of processors; and responsive to said received measurements, adjusting an allocation of new calls to each processor to equalize the occupancies of each of said processors;

wherein said adjusting is performed periodically and comprises adding to an allocated fraction for each processor for a prior period a predetermined multiple of a difference between an occupancy of said each processor during said prior period and an average occupancy of said plurality of processors during said prior period.

6. The method of claim 5 wherein said allocated fraction for an i'th one of said plurality of processors is determined by an algorithm:

$$S_{1i}=S_{0i}+(A-a_i)G_1,$$

wherein $S_{1i}$, $S_{0i}$ represent an allocated fraction for said i'th processor for a next and said prior period, respectively, A represents an average occupancy of said plurality of processors during said prior period, $a_i$ represents an occupancy of said i'th processor during said prior period, and $G_1$ represents a predetermined gain factor.

7. In a distributed multiprocessing telecommunications control system comprising a plurality of processors each for processing calls, a method of allocating new calls to ones of said plurality of processors comprising the steps of:

receiving a measurement of real time work occupancy of each of said plurality of processors; and responsive to said received measurements, adjusting an allocation of new calls to each processor to equalize the occupancies of each of said processors;

wherein said occupancy of each of said processors is measured periodically over the same period, and said adjusting is performed at a beginning of each period.

8. The method of claim 7 wherein each of said processors is polled periodically to transmit said measurement.

9. A method of assigning work to a plurality of processors comprising:

determining a work occupancy for each of said processors;

responsive to said occupancy determining, adjusting allocation fractions of new work for each of said processors toward work occupancy equalization among said processors; and thereafter allocating new work to said processors based on said adjusted allocation fractions.

10. In a distributed multiprocessing system comprising a plurality of processors each for performing data processing operations in response to requests, a method of allocating new requests to ones of said plurality of processors comprising the steps of:

measuring a work occupancy of each of said plurality of processors;

responsive to said measuring, periodically adjusting allocation fractions of new work requests for each processor toward work occupancy equalization among said processors; and thereafter, allocating new work to said processors based on said adjusted allocation fractions.

11. The method of claim 10 wherein said adjusting comprises adding to an allocation fraction for each processor for a prior period a predetermined multiple of a difference between an occupancy of said each processor during said prior period and an average occupancy of said plurality of processors during said prior period.

12. In a distributed multiprocessing telecommunications control system comprising a plurality of processors each for processing calls, a method of allocating new calls to ones of said plurality of processors comprising the steps of:

measuring a work occupancy of each of said plurality of processors;

periodically adjusting a fraction of new calls to be allocated to each processor in such manner that the occupancies of each of said plurality of processors are adjusted toward equalization;

detecting that an average of said measured occupancies of said processors exceeds a predetermined threshold; and shedding a fraction of new calls, said fraction determined to attempt to achieve an average occupancy of said processors approximately equal to said threshold;

wherein said shedding comprises adjusting said shed fraction by a multiple of a difference between a predetermined threshold value and a measured average occupancy of said plurality of processors;

wherein said shed fraction is determined periodically by an algorithm:

$$D_1 = 1 - P_0\left[1 + (T - A)\frac{G_2}{A}\right],$$

wherein $D_1$ represents said shed fraction for a next period, $P_0$ represents a fraction of calls accepted during a period immediately prior to said next period, T represents a predefined constant representing an average occupancy of said plurality of processors at a threshold of overload of said telecommunications control system, A represents average measured occupancy of said plurality of processors during said prior period and $G_2$ represents a predetermined gain factor;

wherein said adjusting comprises adding to an allocated fraction for each processor for a prior period a predetermined multiple of a difference between an occupancy of said each processor during said prior period and an average occupancy of said plurality of processors during said prior period;

wherein said allocated fraction for an i'th one of said plurality of processors is calculated by a formula:

$$S_{1i}=S_{0i}+(A-a_i)G_1,$$

wherein $S_{1i}$, $S_{0i}$ represent an allocated fraction for said i'th processor for a next and said prior period, respectively, A represents an average occupancy of said plurality of processors during said prior period, $a_i$ represents an occupancy of said i'th processor during said prior period, and $G_1$ represents a predetermined gain factor; and wherein said occupancy of each of said processors is measured periodically over the same period, and said adjusting is performed at a beginning of each period.

13. In a distributed multiprocessing telecommunications control system, means for allocating new calls to ones of a plurality of call control processors, comprising:

a plurality of call control processors, each operative under the control of a first program, for measuring its own real time work occupancy; and processor means, operative under the control of a second program and responsive to said measuring real time work occupancy of each of said call control processors, for adjusting an allocation of new calls to each of said call control processors to equalize said real time work occupancies of each of said call control processors.

14. The means for allocating new calls of claim 13 wherein said call control processors are further operative under the control of said first program for measuring said occupancies periodically and for reporting said measurements to said processor means periodically.

15. The means for allocating new calls of claim 13 wherein said processor means is further operative under the control of said second program to determine whether an average of said measured occupancies exceeds a predetermined threshold, and, responsive to said determination, for controlling the shedding of a fraction of new calls, said fraction determined to change an average occupancy of said call control processors to approximately equal said threshold.

* * * * *

UNITED STATES PATENT AND TRADEMARK OFFICE
CERTIFICATE OF CORRECTION

PATENT NO. : 4,974,256

DATED : November 27, 1990

INVENTOR(S) : Bernard L. Cyr, Joseph S. Kaufman and Tzongyu P. Lee

It is certified that error appears in the above-identified patent and that said Letters Patent is hereby corrected as shown below:

TITLE PAGE: right column, line 5;
Attorney, Agent or Firm "Scott W. McLellan", should be
--Werner Ulrich--.

Signed and Sealed this

Twenty-first Day of July, 1992

Attest:

DOUGLAS B. COMER

Attesting Officer

Acting Commissioner of Patents and Trademarks

UNITED STATES PATENT AND TRADEMARK OFFICE
CERTIFICATE OF CORRECTION

PATENT NO. : 4,974,256

DATED : November 27, 1990

INVENTOR(S) : Bernard L. Cyr, Joseph S. Kaufman, Tzongyu P. Lee

It is certified that error appears in the above-identified patent and that said Letters Patent is hereby corrected as shown below:

Column 3, line 17 after "system" insert--, modified according to the present invention --.

Signed and Sealed this

First Day of September, 1992

*Attest:*

DOUGLAS B. COMER

*Attesting Officer*   Acting Commissioner of Patents and Trademarks